United States Patent [19]

Rubey

[11] 4,243,067
[45] Jan. 6, 1981

[54] BALL TYPE CHECK VALVE
[75] Inventor: Robert J. Rubey, Wisconsin Rapids, Wis.
[73] Assignee: Sterling Drug Inc., New York, N.Y.
[21] Appl. No.: 94,732
[22] Filed: Nov. 15, 1979

Related U.S. Application Data

[63] Continuation of Ser. No. 921,168, Jun. 30, 1978, abandoned.
[51] Int. Cl.³ .............................................. F16K 15/04
[52] U.S. Cl. ........................... 137/329.03; 137/515.5; 137/533.13; 137/533.15; 251/368
[58] Field of Search ............. 137/329.03, 515.5, 515.7, 137/533.11, 533.13, 533.15

[56] References Cited
U.S. PATENT DOCUMENTS

| 1,530,827 | 3/1925 | Gunn . | |
|---|---|---|---|
| 1,764,186 | 6/1930 | Teesdale | 137/515.5 |
| 2,018,769 | 10/1935 | Tryon | 137/515.7 |
| 2,121,241 | 6/1938 | Bach . | |
| 2,608,412 | 8/1952 | Bletcher . | |
| 3,096,825 | 7/1963 | Clark . | |
| 3,186,428 | 6/1965 | Bender . | |
| 3,285,270 | 11/1966 | Klinefelter | 137/533.15 |
| 3,620,653 | 11/1971 | Gaylord | 137/515.5 |
| 3,724,496 | 4/1973 | Secrist . | |
| 3,900,230 | 8/1975 | Darling . | |
| 4,043,356 | 8/1977 | Morris . | |

Primary Examiner—Robert G. Nilson
Attorney, Agent, or Firm—Wenderoth, Lind & Ponack

[57] ABSTRACT

A check valve which has top and bottom flanges and a valve body therein between. The flanges have aligned holes therethrough which serve as an inlet (bottom flange) and an outlet (top flange) for fluid flowing through the valve. A spherical ball is contained within the valve body and rests on a ball seat surrounding the inlet. A top plate is positioned adjacent to the top flange and has an opening therethrough which diverges concentrically toward the outlet opening, and a ring shaped ball stop which receives the ball when it is forced away from the ball seat by the fluid is positioned between the top plate and the top of the ball. Also, the inlet may have a restricted portion so that a diverging portion of the inlet opens into the valve body.

12 Claims, 3 Drawing Figures

BALL TYPE CHECK VALVE

This is a continuation of application Ser. No. 921,168, filed June 30, 1978, now abandoned.

BACKGROUND AND SUMMARY OF THE INVENTION

The present invention relates to flow valves in fluid flow lines, and in particular relates to check valves which control fluid flow in one direction.

At the present time, there are numerous ball type check valves available which will "check" the reverse flow of fluid through a flow line. The problem with many of these prior art valves is that they are not always efficient in operation; they are often times noisy; and they do not respond quickly to changes in flow conditions.

In an effort to improve the structure of the common ball-type check valve, the present invention has been developed. The effect of this type of check valve construction is that the ball, once it is lifted, will be held in the ball stop with a lower total flow and will be seated more surely and quickly than is usually possible with previous check valves of this type. Furthermore, because of this construction, extraneous movement of the ball is reduced.

It is, therefore, an object of this invention to provide a valve which has a longer useful life.

It is a further object to provide a valve in which there is less back-flow during valve closing, thus increasing the net flow through the line and conserving energy by requiring less power to move the fluid through the line.

Also, it is an object to provide a valve which has a reduced "water hammer" affect during valve closing, thereby preventing damage to the attached piping.

These objects are achieved in the present invention by providing a check valve which has top and bottom flanges and a valve body thereinbetween. Both flanges have aligned holes therethrough which serve as an inlet (bottom flange) and an outlet (top flange) for fluid flowing through the valve. A spherical ball is contained within the valve body and rests on a ball seat surrounding the inlet. A top plate is positioned adjacent to the top flange and has an opening therethrough which diverges concentrically toward the outlet opening, and a ring shaped ball stop which receives the ball when it is forced away from the ball seat by the fluid is positioned between the top plate and the top of the ball. It is also possible to have the inlet formed with a restricted portion so that a diverging portion of the inlet opens into the valve body.

BRIEF DESCRIPTION OF THE DRAWINGS

These objects and further advantages of the present invention will become more apparent when the following description is taken in consideration with the drawings, wherein.

DETAILED DESCRIPTION OF THE INVENTION

The drawings show three embodiments of the present invention, and as closely as possible, those features which are common to all of the embodiments are numbered similarly.

Figure 1:
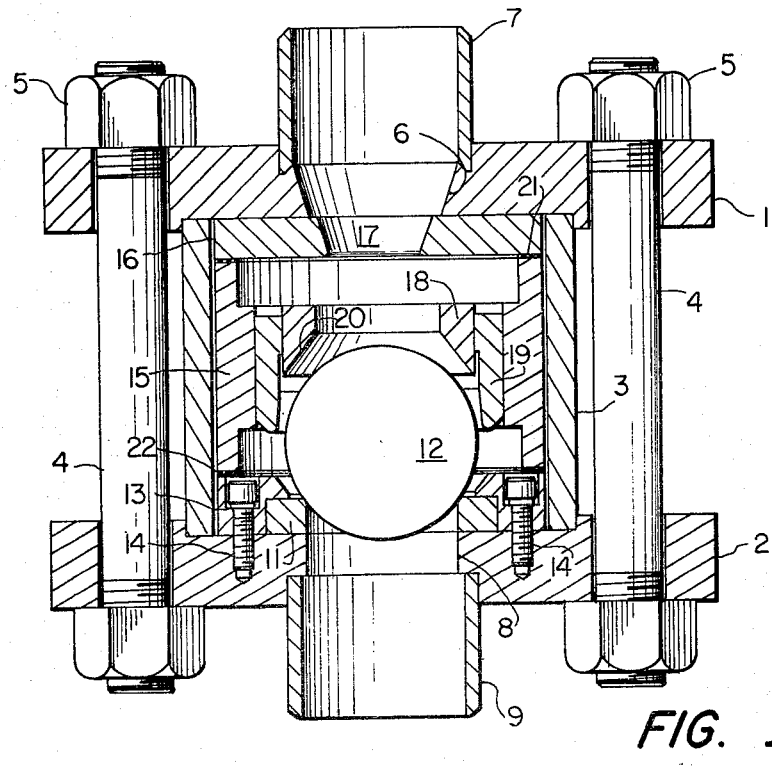
FIG. 1 is a cross-sectional view of the first embodiment of the present invention.
Figure 2:
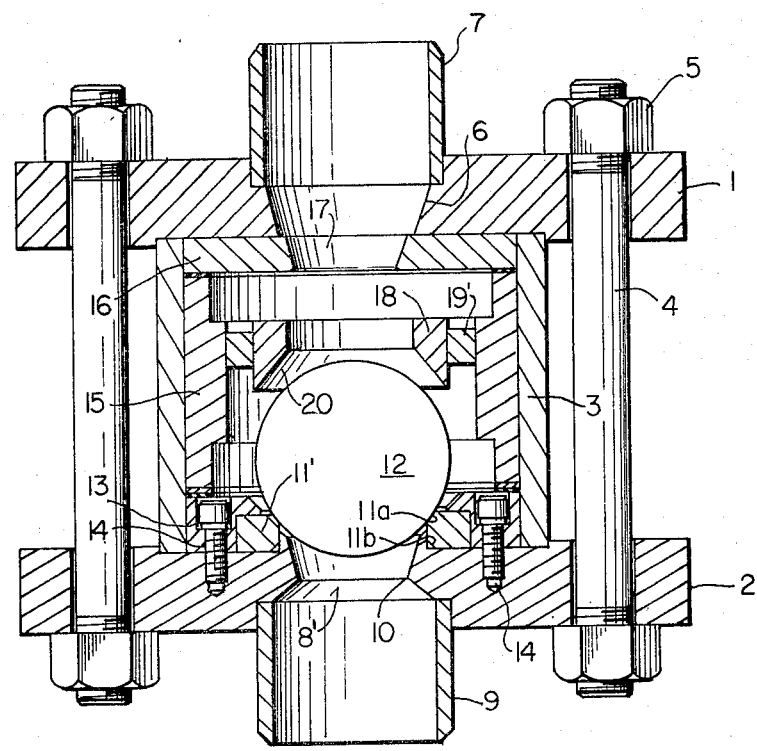
FIG. 2 is a cross-sectional view of a second embodiment of the present invention with modifications to the first embodiment.

The first two embodiments are in FIGS. 1 and 2. Two flanges, a top flange 1 and a bottom flange 2, form the ends of each valve. A valve body 3, which is preferably circular, is sealingly fitted between the top and bottom flanges and is held in position between the flanges 1,2 by means of bolts 4,4 which have hex nuts 5 threaded onto the ends thereof.

Through each top flange 1, which is at the outlet end of the valves, is an outlet opening 6 which is connected to an outlet pipe 7. The outlet opening 6 is preferably conically shaped and diverges concentrically toward the outlet pipe 7 to recover at least some static pressure. A similar opening 8 through the bottom plate 2 acts as an inlet opening 8 into the valve and is connected to an inlet pipe 9. The inlet opening 8 can simply be cylindrical with straight sidewalls as shown in FIG. 1, but often it is preferable to form the inlet opening to have a reduced portion 10, (opening 8' in FIG. 2), so that the fluid entering through the inlet has its velocity increased to assist in lifting the ball.

Between the top and bottom flanges and within the valve body of each valve are the inner structural elements which comprise the working parts of the valve. Surrounding the inlet opening 8 through the bottom flange is a ball seat 11 upon which a valve ball 12 rests. The ball seat 11 is held against the bottom flange 2 by a ball seat holder 13 which surrounds the outside and at least a portion of the top of the ball seat. This ball seat holder 13 is held in position against the bottom flange by means of a plurality of screws 14 which pass through the ball seat holder 13 and thread into the bottom flange 2.

Resting on top of the ball seat holder 13 and surrounding the inside sidewalls of each valve body 3 is a valve liner 15 having a completely hollow center portion. Since the valve body is preferably hollow and cylindrical, the liner 15 inside the body is also cylindrical and has an inside diameter at least slightly larger than the ball 12. Resting on top of the liner 15 between the liner 15 and the top flange 1 is a top plate 16. This top plate 16 has a hole 17 therethrough which is coaxially aligned with a single axis through longitudinal centers of the outlet pipe 7, the outlet opening 6, the liner 15, inlet opening 8, and the inlet pipe 9. Like the diverging shape of the outlet opening 6, the hole 17 is conically shaped in a diverging direction; it expands outward in the direction of the outlet opening 6.

Further coaxially aligned with the above-mentioned elements and inside the liner 15 are a ball stop 18 spaced beneath the top plate 16 and a plurality of spacers 19 which space the ball stop 18 from the liner. The ball stop 18 is usually a ring shape and is positioned above and spaced from the ball 12 and has truncated inside surfaces 20 which are designed to receive the ball therein when the ball is forced away from the ball seat 11 as fluid enters through the inlet opening 8 beneath the ball. The spacers 19 are equally spaced from each other around the circumference of the ball stop 18, and are preferably affixed to both the ball stop and the liner.

The primary structural features which distinguish the valves of FIGS. 1 and 2 lies in the configuration of the spacers 19. Specifically, in FIG. 1 it can be seen that the spacer 19 is a split machined-ring of a greater thickness than the simple split-ring spacer 19′ in FIG. 2. Both valve structures function nearly the same, but with the spacer 19, the inside volume within the valve is decreased, and that will have an effect on the flow characteristics through the valve and will effect the movement of the ball 12. Also, since the spacers act as guides to limit the lateral movement of the ball, the selection of the proper spacer will require a determination of just how much lateral movement can be allowed.

Also, in addition to the structural modifications of the spacers and the configurations of the inlet openings 8,8′, a modification in the ball seat 11 is shown in the ball seat 11′ of FIG. 2. The first ball seat 11 configuration shows only the top inside edge 11a as being chamfered to enable the ball 12 to sit therein. On the other hand, the second ball seat configuration 11′ has two chamfered inside surfaces 11a and 11b. This second ball seat 11′ may therefore be reversed so that both sides may be used as an economy measure.

Finally, in order to insure that a fluid-tight relationship is maintained between the valve liner 15 and the top plate 16 a gasket 21, preferably of some type of rubber, may be positioned thereinbetween. A similar gasket 22 may also be interposed between the bottom of the valve liner 15 and the ball seat holder 13.

Figure 3:
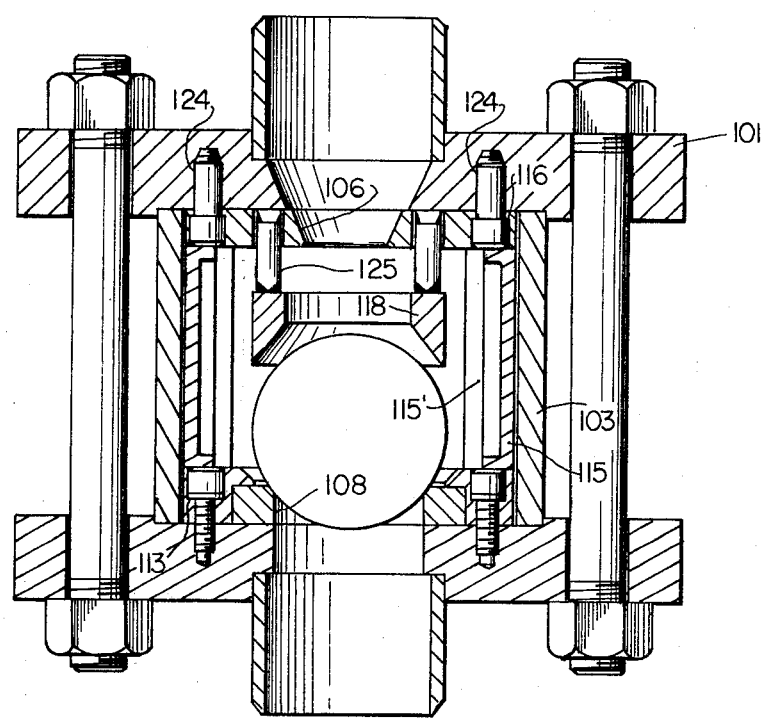
FIG. 3 is a cross-sectional view of a third embodiment of the present invention.

Somewhat differently constructed is the embodiment of this check valve presented in FIG. 3. In this instance, the top plate 116 is screwed onto the top flange 101 by a plurality of screws 124. The top plate 116 itself, however, still has a diverging outlet opening 106 which is axially aligned with an inlet opening 108.

The ball stop 118 in this embodiment is connected by means of a plurality of spaced pins 125 to the top plate 116. The inner surface of the ball stop 118 still remains angled to receive the ball 112 therein.

On the inside of the valve body 103 are only a first valve liner 115 and a second liner sleeve 115′; there are no spacers holding the ball stop edges. This liner 115 and sleeve 115′ rest between the top plate 116 and the ball seat holder 113, which is similar in construction to the previous ball seat holder 13.

With regard to the various alternative constructions disclosed in FIGS. 1 and 2, it should be understood that these various constructions may also be incorporated into the structure of FIG. 3. For example, a restricted inlet opening with a reduced portion may be utilized along with a reversible ball seat.

For the most part, the various elements of these valves may be made of any material which will be serviceable in the environment where the valve is employed; such as stainless steel for the rigid pieces and synthetic plastics for the more resilient components. It has been found, however, that the valve ball material which has the best strength, hardness, abrasion resistance and optimum specific gravity (approximately 1.5) for most aqueous slurries is Delrin, a plastic manufactured by E. I. duPont de Nemours and Company. This material has a Durometer Hardness of about 90 Shore on the D scale. Polyurethane having a hardness of 70 Shore and weighted with lead may also be used where the specific gravity differences between the Delrin ball and the slurry is insufficient. Metal balls may also be used, however, they have the disadvantages of: (a) excessive wear of all parts which they contact, (b) higher cost than plastic; and (c) excessive noise upon closing. The valve seats in this valve are preferably constructed of polyurethane having a Durometer Hardness of 95 on the A scale.

When this type of check valve is installed in a fluid flow line, the inlet pipe 9 is connected to the fluid source so that the fluid enters the valve through the inlet opening 8. As the velocity or pressure of the fluid increases, the ball 12 is forced away from the ball seat 11 until it rests on the ball stop 18. Since the ball stop 18 and the seat are spaced further apart than the diameter of the ball, the fluid enters through the inlet, flows around the ball, and passes between the spacers 19 and out of the valve through the outlet opening 6.

In considering the operation of this type of valve, the present valve structures produce effects which are significant improvements over the prior art. First of all, because the outlet opening 6 is constructed in a diverging conical manner, a venturi effect is produced on the top of the ball held in the ball stop as fluid is passing through the valves. A higher velocity is produced as the fluid flows through the outlet and this reduces the pressure on the top of the ball driving forward flow. Because of this reduced pressure, the ball is held more surely in the ball stop and when the fluid flow is discontinued or reversed, a jetting effect results at the top of the ball stop and ball is more quickly and surely forced back against the ball seat. By also forming the inlet opening 8 with the reduced portion 10, a second venturi effect is created which increases the inlet velocity of the fluid and thus enhances the lifting effect of the fluid for carrying the ball away from the seat. The overall effect of this construction for a ball type check valve is that the ball, after lifting from the ball seat, is held in the ball stop with less total flow of fluid; and when the flow of fluid is reversed, the ball is seated more quickly and surely than is normally expected.

It is recognized that various modifications other than those specifically discussed herein may be made to the structure without departing from the scope of the invention.

What is claimed is:

1. A check valve comprising:
   first and second flanges spaced from each other, said first flange having an outlet opening therethrough and said second flange having an inlet opening therethrough coaxially aligned with said outlet opening;
   a spherical ball between said flanges;
   ball seat means concentric with and surrounding said inlet opening for receiving and seating said ball therein;
   a top plate between said first flange and said ball, said top plate having a hole therethrough coaxially aligned with said openings in said flanges, said hole being of conical shape and diverging away from said ball;
   ball stop means coaxially aligned with said axis through said inlet and outlet openings and spaced between said top plate and said ball and spaced from said ball seat means a distance slightly greater than the diameter of said ball for receiving said ball therein; and
   a valve body between said first and second flanges, and surrounding said ball, said top plate and said ball stop, and said ball seat means.

2. A valve as claimed in claim 1, further comprising fastening means through said first and second flanges for holding said flanges together with said valve body thereinbetween.

3. A valve as claimed in claim 1, wherein said ball seat means is comprised of:
- a ball seat surrounding said opening in said second flange; and
- a ball seat holder surrounding and at least partially extending across the top of said ball seat.

4. A valve as claimed in claim 3, wherein said ball seat means is further comprised of attaching means through said ball seat holder and into said second flange for attaching said ball seat holder to said second flange.

5. A valve as claimed in claim 3, wherein said ball seat is reversible.

6. A valve as claimed in claim 1, wherein said ball stop means is comprised of:
- a ring above said ball having a truncated inner surface for receiving said ball therein, said ring being spaced from said top plate and coaxially aligned with said hole through said top plate;
- a liner around the inside of said valve body between said top plate and said ball means; and
- a plurality of spacers spaced from each other around the circumference of said ring connecting said ring and said liner.

7. A valve as claimed in claim 1, wherein said ball stop means is comprised of:
- a ring above said ball having a truncated inner surface for receiving said ball therein, said ring being coaxially aligned with said hole through said top plate; and
- a plurality of spacers spaced from each other around the top of said ring between said ring and said top plate connecting said ring and said top plate.

8. A valve as claimed in claim 6 or 7, wherein the diameter of said ball, and the outside diameter of said ring are approximately the same.

9. A valve as claimed in claim 7, further comprising:
- a liner around the inside of said valve body between said top plate and said ball seat means; and
- a sleeve inside of said liner around said ball and held between said top plate and said ball seat means.

10. A valve as claimed in claim 1, wherein said top plate is connected to said first flange.

11. A valve as claimed in claim 1, further comprising a liner surrounding the inside of said valve body between said top plate and said ball seat means.

12. A valve as claimed in claim 1, wherein said inlet opening through said second flange has a reduced diameter at one portion thereof.

* * * * *